United States Patent [19]

Brehmer et al.

[11] 4,129,149
[45] Dec. 12, 1978

[54] CONTROL VALVE MEANS

[75] Inventors: Roland Brehmer, Fellingsbro; Bengt Sörberg, Kungsör, both of Sweden

[73] Assignees: Aktiebolaget Fellingsbro Verkstader, Fellingsbro; Erik Sorberg Armaturfabrik Aktiebolag, Kungsör, both of Sweden

[21] Appl. No.: 875,899

[22] Filed: Feb. 7, 1978

Related U.S. Application Data

[63] Continuation of Ser. No. 616,850, Sep. 25, 1975, abandoned.

[51] Int. Cl.² .................... F17D 3/00; F16K 43/00
[52] U.S. Cl. .................. 137/599.1; 137/315; 236/42; 285/131; 285/133 R
[58] Field of Search ............... 137/315, 599.1, 625.29; 236/36, 42, 43, 99 R; 285/131, 133 R, 134, 179

[56] References Cited

U.S. PATENT DOCUMENTS

| 686,098 | 11/1961 | Martin | 137/599.1 |
| 1,665,655 | 4/1928 | Clisson | 285/133 R |
| 3,512,551 | 5/1970 | Henningsson | 137/599.1 |
| 3,618,855 | 11/1971 | Nilsson et al. | 137/599.1 |
| 3,901,438 | 8/1975 | Christiansson | 236/43 |

FOREIGN PATENT DOCUMENTS

| 1928094 | 10/1974 | Fed. Rep. of Germany | 137/599.1 |
| 1137535 | 12/1968 | United Kingdom | 137/599.1 |
| 1223864 | 3/1971 | United Kingdom | 137/599.1 |
| 1298415 | 12/1972 | United Kingdom | 137/599.1 |

Primary Examiner—Martin P. Schwadron
Assistant Examiner—G. L. Walton
Attorney, Agent, or Firm—Strauch, Nolan, Neale, Nies & Kurz

[57] ABSTRACT

A control valve for a central heating system, the valve having an inlet, an outlet, a branch outlet, and a bypass conduit between the inlet and the outlet, the cross sectional flow area of the bypass conduit being independent of the position of either a main control valve member for controlling flow through the branch outlet or a settable valve member for limiting flow through the branch outlet.

8 Claims, 4 Drawing Figures

CONTROL VALVE MEANS

This is a continuation of application Ser. No. 616,850, filed Sept. 25, 1975, now abandoned.

The present invention is concerned with improvements in or relating to valves.

In U.K. patent specification No. 1,221,026 of Aktiebolaget Fellingsbro Verkstader there is described a fluid flow control valve adapted for particular, but not exclusive use, with a single line central heating system. This control valve is arranged for main flow of hot water from an inlet through a branch outlet to a radiator and return flow through the branch outlet to a main outlet, and for bypass flow direct from the inlet to the main outlet.

It is an object of the present invention to provide an improved valve arranged for such main flow and bypass flow, which is particularly but not exclusively adapted for thermostatic control in a single line central heating system.

The present invention relates to a fluid flow control valve comprising a valve housing having an inlet, a main outlet and a branch outlet arranged for flow of fluid from the inlet to the branch outlet and return flow through the branch outlet to the main outlet, a bypass conduit for bypass flow direct from the inlet to the main outlet, a fixed partition dividing the branch outlet into side by side flow and return passages, a main control valve member mounted in the housing for linear movement to vary the flow through the branch outlet in the normal operation of the valve and a second valve member variably settable to limit the flow through the branch outlet, the cross sectional flow area of the bypass conduit being independent of the positions of the main and second valve members.

There now follows a description, to be read with reference to the accompanying drawings, of a hot water flow control valve embodying the invention. This description is given by way of example of the invention only and not by way of limitation thereof.

Figure 1:
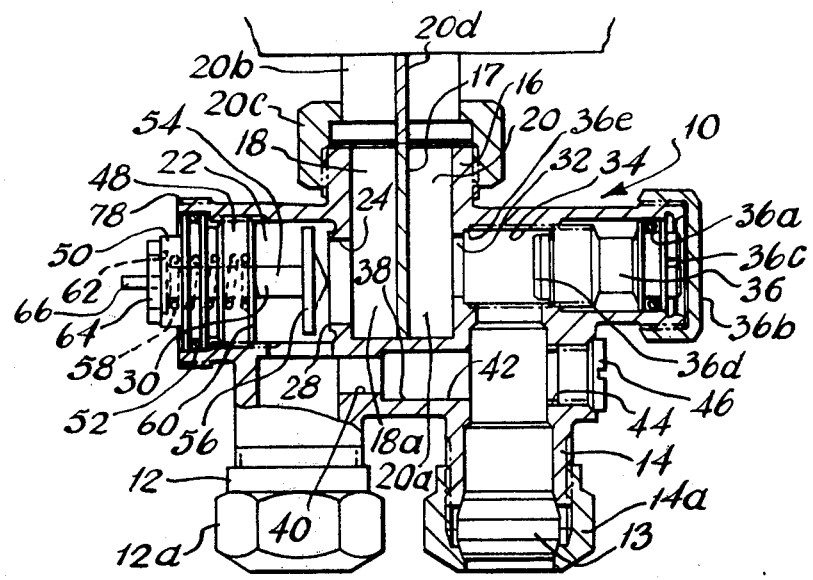
FIG. 1 shows a sectional side view of parts of the valve embodying the invention.

The valve embodying the invention comprises a valve housing 10 which comprises an inlet 12, a main outlet 14 parallel with the inlet 12, and a branch outlet 16 opposite and parallel to the inlet 12 and the outlet 14, the axes of the inlet and outlets being coplanar. As will be explained, the inlet 12 and the main outlet 14 are interchangeable in function. The inlet 12 and the outlet 14 are arranged to be connected to hot water supply and return connections (not shown) via coupling nuts 12a, 14a respectively, which retain brass sealing collars 13 (only one of which is shown).

The branch outlet 16 is divided symmetrically by a fixed planar partition 17 into side by side parallel flow and return passages 18, 20 respectively so that the flow passage 18 (including its upstream end 18a) is positively isolated from the return passage 20 (including its downstream end 20a) at all times in the normal operation of the valve. When the valve is in use the branch outlet 16 is connected to a central heating radiator 106 (FIG. 4) via a coupling 20b which is secured to the valve housing by a coupling nut 20c; another partition 20d extends along the coupling 20b to provide separation of the flow and return.

The inlet 12 communicates with the flow passage 18 via a bore 22 in the housing 10 and a port 24 in a side wall of the passage 18; the bore 22 is at right angles to the inlet 12 and also at right angles to the branch outlet 16. A valve seating 28 is provided around the port 24 for co-operation with a linearly movable main control valve member 30 which in the normal operation of the valve is adapted to control flow from the inlet 12 through the passage 18 to the radiator by directly varying the flow through the port 24.

The return passage 20 similarly communicates with the main outlet 14 via a port 32 in a side wall of the passage 16 and a bore 34 in the housing 10; the bore 34 is parallel to the bore 22. A variably settable valve member or throttling plug is screwed into the bore 34 and acts to limit the flow; the plug 36 is sealed with respect to the bore 34 by a rubber O-ring 36a; the bore 34 is closed around the plug 36 by a removable threaded end cap 36b. When it is required to adjust the setting of the plug 36, the end cap 36b is removed and the plug 36 screwed in or out by engagement of a screwdriver or the like in an end slot 36c of the plug 36. The plug 36 comprises a projecting end portion 36d which is arranged to engage against a seating 36e around the port 32 to close the port 32 when desired, for example when it is required to isolate the radiator e.g. for maintenance purposes.

Figure 5:
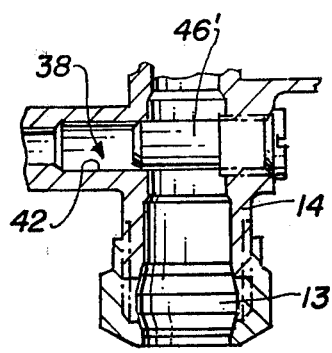
FIG. 5 is a fragmentary view in section illustrating a removable plug for blocking the bypass conduit.

A bypass conduit 38 leads from the inlet 12 to the outlet 14 and provides for bypass flow direct from the inlet 12 to the outlet 14. The conduit 38 comprises a narrower upstream portion 40 leading from the inlet 12 followed by a wider downstream portion 42 leading into the outlet 14 but in a modification the conduit 38 is of uniform diameter. The downstream portion 42 is opposite a conduit extension 44 which leads out of the outlet 14 and is shown closed by a threaded closure plug 46. In a modification for use with two-pipe systems, the threaded plug 46 is replaced by another threaded plug 46' as illustrated in FIG. 5 which completely closes the bypass conduit 38. It will be noted that the cross-sectional flow area of the bypass conduit 38 is independent of the position of the main control valve member 30 and of the throttling plug 36.

Figure 2:
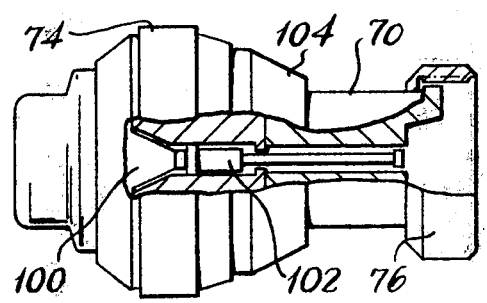
FIG. 2 shows a thermostatic control head.

The valve member 30 forms part of a valve member unit 48 which is screwed into a threaded portion of the bore 22. The unit 36 comprises a casing 50 which is sealed with respect to the bore 22 by a rubber O-ring 52. Mounted in the casing 50 is a valve stem 54 of the valve member 30 and mounted on the valve stem 54 where it extends outside the casing 50 is a rubber valve head 56 arranged to seat against the seating 28 when in a closed position. A spring 58 acts between an end face 60 of the casing 50 and a plate 62 secured to the stem 44. The casing 50 is closed by a threaded plug 64 which provides an end stop for the plate 62. A stub 66 of the stem 54 extends freely through the plug 64 and is arranged to be engaged by a plunger 102 of a thermostatic control head 70 (FIG. 2); alternatively, a manual control head 72 (FIG. 3) is used. It will be realised that the effect of the spring 58 is to urge the valve head 56 to a left hand position (FIG. 1) away from the seating 28, and that appropriate operation of the control head 70 or 72 causes corresponding movement of the valve head 56 towards the seating 28 via the valve stem 54 and against the action of the spring 58; reverse operation of the control head causes corresponding movement of the valve head 56 away from the seating 28 under the action of the spring 58.

Where the thermostatic head 70 is used it is for example of a type marketed by A. B. Markaryds Metallarmatur of Markaryd, Sweden, as suitable for Type TFB-TFR-TFW thermostatic valves. A closely similar type of thermostat is marketed in the United Kingdom by Honeywell. This type of thermostat comprises a heat sensitive element 100 which actuates the thermostat plunger 102 engaging the stub 66. The setting of the thermostat is variable by a manual control knob 74 which is screwed onto a body portion 104 of the head 70; so that rotation of the knob 74 causes axial adjustment of the heat sensitive element and plunger. The control head 70 is secured to the casing 10 by a nut 76 which screws onto a thread 78 on the casing 10.

While the valve embodying the invention is believed to be well suited for thermostatic operation using the head 70, it may also be conveniently used with the manual head 72 in appropriate circumstances and it will be realised that the two heads 70, 72 are readily interchangeable should it be desired for example to change from manual to thermostatic operation, and this can be done without draining the system in any way.

Figure 3:
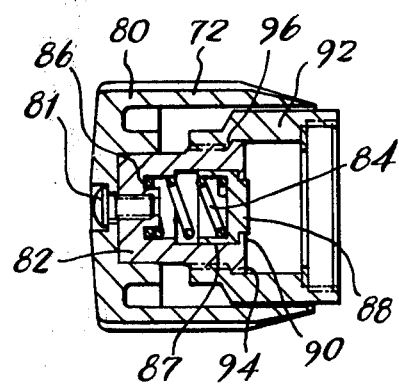
FIG. 3 shows a manual control head.

The manual control head 72 comprises an outer generally hollow knob member 80 in which is secured by a screw 81 a spring housing 82. The spring housing 82 contains a spring 84 which acts between an annular recessed spring seating 86 provided by a rear end face of the housing 82 and an inner rearwardly facing recess 87 of a plunger 88 which is slidably mounted in the housing 82; the plunger 88 is urged by the spring 86 against an annular inwardly directed flange 90 at the front of the housing 82. The housing 82 is screwed into a threaded connector 92 and rotation of the knob member 80 relative to the connector 92 causes axial movement of the housing 82 and of the knob member 80 relative to the connector 92. In FIG. 3 the housing 82 and knob member 80 are shown in a left hand terminal position in which a flange 94 on the housing 82 engages a shoulder 96 in the connector 92. The connector 92 screws onto the thread 78 of the housing 10 so that the plunger 88 engages the stub 66 of the stem 54. Thus, it will be realised that rotation of the knob member 80 causes movement of the valve head 56 via the plunger 88 and the valve stem 54. The purpose of the spring 84 is to minimise the risk of excessive tightening of the valve head 56 against the seating 28, the strength of the spring 84 being such that the plunger 88 yields against the action of the spring when the valve head 56 is in engagement with the seating 28 and any attempt is made to turn the knob member 80 beyond a reasonably tight position.

When the valve is in use in a single line central heating system, the plug 36 will normally be pre-set at an appropriate position, and this pre-setting is not changed during normal operation of the valve. The inlet 12 and the outlet 14 are connected in the single line and when the valve head 56 is spaced from its seating 28, hot water flows from the inlet 12 past the valve head 56 and through the passage 18 into the radiator. Hot water also flows directly from the inlet 12 to the outlet 14 through the bypass conduit 38. Return flow of hot water from the radiator is through the passage 20 and into the outlet 14.

When it is required to completely isolate the radiator, for example for maintenance purposes, e.g. removal of the radiator, the plug 36 is moved to the left (FIG. 1) so that the port 32 is closed by the projection 36d; then with the valve head 56 against its seating 28, there is 100% bypass flow from the inlet 12 to the outlet 14 and the branch outlet 16 is isolated from the hot water supply.

As previously indicated, the inlet 12 and the outlet 14 are interchangeable in function, in which case flow to the radiator will be through the passage 20, return flow through the passage 18, and bypass flow as before but in the reverse direction. In this case, however, it will be realised that the radiator will be controlled by varying the return flow through the passage 18 and past the valve head 56. It will be noted that the arrangement of the valve is generally symmetrical which facilitates this reversibility of operation.

The valve is so arranged and dimensioned that the percentage of bypass flow with respect to total flow through the valve is in the range from 100% with no flow through the branch outlet down to 50% with the valve head 56 and plug 36 in their fully open positions.

Figure 4:
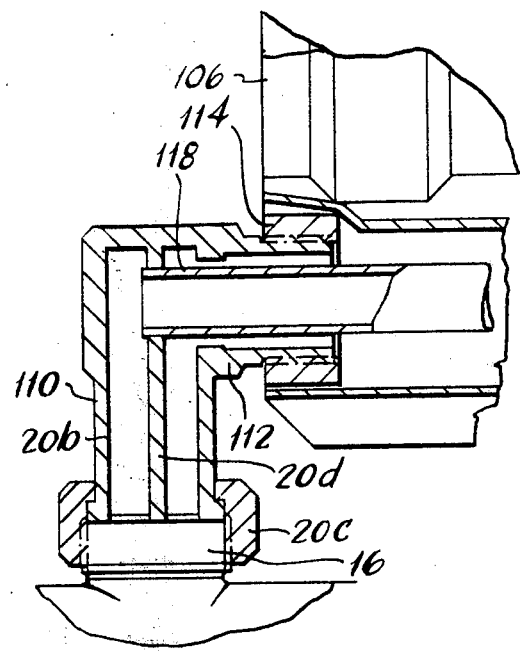
FIG. 4 shows connection of the valve to a radiator.

FIG. 4 shows connection of the valve embodying the invention to the radiator 106 (only part of which is shown) via the coupling 20b. The coupling 20b comprises an upwardly extending portion 110 co-axial with the branch outlet 16 and in which is located the partition 20d, the partition 20d providing a substantially unbroken extension of the partition 17 (see FIG. 1). The coupling 20b also comprises a portion 112 at right angles to the portion 110 and the portion 112 is externally threaded for screwing into a corresponding internally threaded portion 114 of the radiator 106. The portion 112 also comprises an axial inner pipe member 118 which extends through the partition 20d; the pipe member 118 extends along a lower portion of the radiator in known manner to provide for adequate distribution of the inlet flow of hot water into the radiator 106; return flow from the radiator 106 takes place in the annular space between the pipe 118 and the portion 112 of the coupling 20b.

The angular position of the coupling 20b about the axis of the portion 112 is variable by screwing into or out of the threaded portion 114 within the limits of adequate water-tightness to provide for different positions of the valve relative to the radiator 106, according to skirting requirements and the like.

I claim:
1. A central heating radiator control valve comprising (a) a valve housing having:
   (i) an inlet, a main outlet and a branch outlet arranged for flow of heating fluid from the inlet to the branch outlet and return flow through the branch outlet to the main outlet;
   (ii) a fixed planar longitudinal partition dividing the branch outlet into side-by-side relatively isolated flow and return passages;
   (iii) a first valve passageway axially transverse to the branch outlet and communicating the inlet to the flow passage, the first valve passageway and flow passage defining a first valve port therebetween;
   (iv) a second valve passageway axially transverse to the branch outlet and communicating the return passage to the main outlet, the return passage and second valve passageway defining a port therebetween;

(v) a first valve seating in the first valve passageway around the first valve port;

(vi) a second valve seating in the second valve passageway around the second valve port; and (vii) (a) a bypass conduit with its axis parallel to the axes of the first and second valve passageways for bypass flow direct from the inlet to the main outlet; (b) a main control valve member mounted in the first valve passageway for linear movement axially of the passageway towards and away from the first valve seating to vary the flow through the branch outlet in the normal operation of the valve; and (c) a second, settable, valve member mounted in the second valve passageway for linear movement axially of the passageway and independent of the main control valve member to limit the flow through the branch outlet; the cross-sectional flow area of the bypass conduit being independent of the positions of the main and second valve members in the normal operation of the valve, the bypass conduit remaining open in all operative positions of the main control valve member, and the valve ports being closable by the respective valve members to isolate the branch outlet.

2. A radiator flow control valve as claimed in claim 1, in which said main control valve member is manually movable.

3. A radiator flow control valve as claimed in claim 1, including a temperature responsive member controlling the position of the main control valve member.

4. A radiator flow control valve as claimed in claim 1, in which the axes of the inlet, the branch outlet and the main outlet are co-planar.

5. A radiator control valve as claimed in claim 1, wherein the disposition of the main inlet, the main outlet and the flow and return passages is generally symmetrical for reversibility of the functions of the main inlet and the main outlet and the functions of the flow and return passages.

6. A radiator control valve as claimed in claim 1, wherein the bypass conduit presents an access opening, and the valve comprises plug means for closing the access opening and for leaving the bypass conduit open for flow therethrough.

7. A radiator control valve as claimed in claim 1, in combination with a coupling adapted to couple the valve to a central heating radiator, the coupling comprising a first portion connectible to the branch outlet co-axially therewith and a second portion leading from the first portion at right angles thereto, and comprising coupling means for connecting the second portion of the radiator and for permitting angular adjustment of the coupling about the axis of the second portion.

8. A central heating radiator control valve comprising (a) a valve housing having:

(i) an inlet, a main outlet and a branch outlet arranged for flow of heating fluid from the inlet to the branch outlet and return flow through the branch outlet to the main outlet;

(ii) a fixed planar longitudinal partition dividing the branch outlet into side-by-side relatively isolated flow and return passages;

(iii) a first valve passageway axially transverse to the branch outlet and communicating the inlet to the flow passage, the first valve passageway and flow passage defining a first valve port therebetween;

(iv) a second valve passageway axially transverse to the branch outlet and communicating the return passage to the main outlet, the return passage and second valve passageway defining a port therebetween;

(v) a first valve seating in the first valve passageway around the first valve port;

(vi) a second valve seating in the second valve passageway around the second valve port; and (vii) (a) a bypass conduit with its axis parallel to the axes of the first and second valve passageways, leading directly from the inlet to the main outlet and presenting an access opening; (b) a main control valve member mounted in the first valve passageway for linear movement axially of the passageway towards and away from the first valve seating to vary the flow through the branch outlet in the normal operation of the valve; (c) a second, settable, valve member mounted in the second valve passageway for linear movement axially of the passageway and independent of the main control valve member to limit the flow through the branch outlet; the cross-sectional flow area of the bypass conduit being independent of the positions of the main and second valve members and the valve ports being closable by the respective valve members to isolate the branch outlet; and (d) removable plug means completely blocking the bypass conduit, thereby adapting the valve for use in a double line central heating system; and the plug means being replaceable by plug means for closing the access opening while leaving the bypass conduit open for flow therethrough, thereby adapting the valve for use in a single line central heating system.

* * * * *

UNITED STATES PATENT OFFICE
CERTIFICATE OF CORRECTION

Patent No. 4,129,149　　　　　　　　　Dated December 12, 1978

Inventor(s) Roland Brehmer and Bengt Sorberg

It is certified that error appears in the above-identified patent and that said Letters Patent are hereby corrected as shown below:

On the abstract page insert priority data:
--British patent application No. 43018/74 filed on October 3, 1974--.

Column 5, line 51, change "of" to --to--.

*Signed and Sealed this*

*Twenty-fourth* Day of *April 1979*

[SEAL]

Attest:

RUTH C. MASON　　　　　　　　DONALD W. BANNER
*Attesting Officer*　　　　*Commissioner of Patents and Trademarks*